Patented Feb. 5, 1935

1,990,399

UNITED STATES PATENT OFFICE 1,990,399

PROCESS FOR THE PREPARATION OF CONDENSATION PRODUCTS

Maurice Belloc, Paris, France, assignor to Societe Nobel Francaise, Paris, France No Drawing. Application March 18, 1933, Serial No. 661,636. In France April 20, 1932

7 Claims. (Cl. 260—2)

The present invention relates to a process for the preparation of condensation products.

There is in the trade, a liquid ester known as vinyl acetate which has the property of polymerizing to give a gum called polymerized vinyl acetate. This ester is susceptible of being saponified and yields a corresponding alcohol, which may be termed polyvinylic alcohol or polymerized vinylic alcohol. It is known that condensation products of value may be prepared by causing a reaction of the so called polymerized vinylic alcohol on bodies of aldehydic function, such as formaldehyde or acetaldehyde.

I have found that such products may be prepared by starting with the polymerized vinylic ester, and consequently, without isolating the polyvinylic alcohol and without previously placing the ester in solution in an organic compound.

This invention, therefore, contemplates a process whereby the condensation product may be obtained in a single phase and at the ordinary temperature, thus obviating the necessity of bringing the polyvinylic ester to solution in an organic solvent and consequently, eliminating the recuperation of this solvent; and likewise, obviating the necessity of carrying out the reaction in the hot, which results in greatly increased facilities of operation and appreciable economies in the cost price.

According to the invention, hydrochloric acid suitably concentrated, having added thereto slight quantities of ethylic alcohol or another alcoholic solvent of polymerized vinylic ester, rapidly realized in the cold the saponification of polymerized vinylic esters and produces at the same time, the combination of the polyvinylic alcohol thus produced with the aldehydes.

The hydrochloric acid serves as a cheap solvent for all the reactives placed in presence. Moreover, it produces without elevation in temperature, the saponification of the vinylic ester and its condensation with the aldehyde, without necessity of isolating the intermediary products.

The working of the process may be advantageously realized as follows:

5 kgs. of polymerized vinyl acetate under form of a colorless resin are introduced in a recipient provided with an agitation system.

There is then added:

| | |
|---|---|
| Water | 5 litres |
| Ethylic alcohol | 1 kg. |
| Hydrochloric acid 22/23° Baumé | 10 kgs. |

The mixture is permitted to set for a period of approximately five hours, at the end of which time the mass becomes thoroughly homogeneous. At this moment, there is added:

| | |
|---|---|
| Acetic paraldehyde | 2 kgs. 500 |

The mass thickens, and is rendered homogeneous by agitation. The mass is then again permitted to remain in contact for approximately five hours.

At the expiration of this period, water is gradually added, and the condensation product is precipitated. Washing is done in the cold, and drying in the open air and at low temperature. The product may be bleached if necessary and is soluble in the usual solvents, particularly alcohol, methyl acetate and chloroform.

The solutions obtained may be used successfully for the preparation of cinematographic films and supple phonograph disks.

The dried product may be agglomerated under the action of heat and pressure, with or without the addition of plastic agents. The transparent and colorless blocks obtained may be sawed and turned. By adding suitable charges, it is possible to obtain moulding powders.

Manifestly, it may be possible to introduce certain modifications in the realization of the process, and therefore, it is to be understood that I do not intend to restrict myself to the precise and exact example given herein, but I consider any modification coming within the scope of the following claims as being within the spirit of the invention.

I claim:—

1. A process for the preparation of condensation products comprising, combining polymerized vinyl esters with an aldehyde in a solvent reactive medium consisting substantially of a concentrated solution of hydrochloric acid, and conducting the reaction entirely at ordinary temperature.

2. A process for the preparation of condensation products comprising, combining polymerized vinyl esters with an aldehyde in a solvent reactive medium consisting of a concentrated solution of hydrochloric acid and ethylic alcohol, the quantity of alcohol being insufficient to dissolve the esters, and conducting the reaction entirely at ordinary temperature.

3. A process for the preparation of condensation products comprising, combining at ordinary temperature polymerized vinyl acetate with actic paraldehyde in a solvent reactive medium consisting substantially of a concentrated solution of hydrochloric acid.

4. A process for the preparation of condensation products comprising, combining at ordinary temperature polymerized vinyl acetate with acetic paraldehyde in a solvent reactive medium consisting of a concentrated solution of hydrochloric acid and ethylic alcohol, the quantity of alcohol being insufficient to dissolve the acetate.

5. A process for the preparation of condensation products comprising, combining by agitation at ordinary temperature polymerized vinyl acetate with acetic paraldehyde in a solvent reactive medium consisting substantially of a concentrated solution of hydrochloric acid.

6. A process for the preparation of condensation products comprising, combining by agitation at ordinary temperature polymerized vinyl acetate with acetic paraldehyde in a solvent reactive medium consisting of a concentrated solution of hydrochloric acid and ethylic alcohol, the quantity of alcohol being insufficient to dissolve the acetate.

7. A process for the preparation of condensation products comprising, reacting at ordinary temperature polymerized vinyl acetate in a solvent consisting of a concentrated solution of hydrochloric acid and ethylic alcohol, the quantity of alcohol being insufficient to dissolve the acetate; leaving the mixture to set for a period of time sufficient for its homogeneity; adding acetic paraldehyde to the homogeneous mixture; rendering the mass homogeneous by agitation; again leaving the mass to set; subsequently precipitating the condensation product by gradually adding water; and finally washing and drying at ordinary temperature.

MAURICE BELLOC.